Patented Apr. 14, 1942

2,279,385

UNITED STATES PATENT OFFICE 2,279,385

PROCESS FOR PURIFYING PHENYLENEDI-
AMINE DERIVATIVES

Marshall R. Brimer, Kingsport, Tenn., assignor
to Eastman Kodak Company, Rochester, N. Y.,
a corporation of New Jersey No Drawing. Application December 23, 1940,
Serial No. 371,397

8 Claims. (Cl. 260—577)

This invention relates to a process for purifying phenylenediamine derivatives.

It is known the N,N'-dialkyl derivatives of p-phenylenediamine are formed, together with other products, when hydroquinone is condensed, with the elimination of water, with primary alkyl or secondary alkyl primary amines, containing at least four carbon atoms, as shown in United States Patent 2,163,639, dated June 27, 1939. It is further known that from such condensation products, N,N'-dialkyl-p-phenylenediamines can be obtained by a process comprising (1) treating the condensation products with an alkali, such as an alkali metal hydroxide, (2) extracting the so-treated condensation product with a hydrocarbon or ether solvent, and (3) removing the solvent from the extract to obtain the phenylenediamine derivative, as shown in the copending application of H. Von Bramer and A. C. Ruggles, Serial No. 275,718, filed May 25, 1939.

It has been found that to increase the quantity of phenylenediamine derivatives in the aforesaid condensation products to the point where the condensation products provide an economical source of the phenylenediamine derivatives, severe conditions, such as increased temperatures, must be employed during the preparation of the condensation products. However, when such conditions are employed, the phenylenediamine derivatives obtained from the condensation products are usually contaminated with undesirable colored impurities which cannot be effectively removed by distillation. I have now found a method for removing these colored impurities from the phenylenediamine derivatives.

It is, accordingly, an object of my invention to provide a process for purifying phenylenediamine derivatives. Other objects will become apparent hereinafter.

In accordance with my invention, I remove colored impurities from a N,N'-dialkyl-p-phenylenediamine obtained from a condensation product produced by condensing, with the elimination of water, hydroquinone with a primary amine selected from the group consisting of primary alkyl and secondary alkyl primary amines containing at least four carbon atoms, by treating a salt of the phenylenediamine derivative with an alcohol selected from the group consisting of methyl, ethyl and isopropyl alcohols. The colored impurities pass into solution in the alcohol leaving the salt of the phenylenediamine derivative.

In practice, I have found it advantageous to dissolve the impure phenylenediamine derivative in the alcohol, and then, to treat the solution with an acid. The salt of the phenylenediamine derivative separates out, while the colored impurities remain in solution. It is also advantageous, in practice, to add the phenylenediamine derivatives to an alcoholic solution of an acid; in which case the colored impurities pass into solution, while the salt of the phenylenediamine derivative separates out. However the treatment is carried out, the alcohol containing the colored impurities can be readily removed from the salt of the phenylenediamine derivative, leaving the salt in a pure form.

The phenylenediamine derivative can then be freed from its salt by treating an aqueous solution of the salt with a base, such as an alkali metal carbonate. The phenylenediamine derivatives separate from the aqueous solution as oils which can then be obtained as nearly colorless, viscid liquids, by distillation at pressures of from 0.1 to 0.2 mm. of mercury.

As acids for carrying out my process, hydrochloric, sulfuric, phosphoric and acetic are exemplary. I have found that hydrochloric acid is advantageously employed, and that an alcoholic solution of hydrogen chloride is especially suitable.

The following example will serve to illustrate the manner of practicing my invention.

*Example*

110 g. of N,N'-di-(secondary butyl)-p-phenylenediamine (obtained by condensing, with the elimination of water, hydroquinone with secondary butyl primary amine) were dissolved in one liter of isopropyl alcohol. To the resulting solution 100 g. of 36% hydrochloric acid were added. The mixture was stirred and the salt of the phenylenediamine derivative was collected on a filter.

The salt of the phenylenediamine derivative was dissolved in one liter of water. The resulting solution was treated with solid sodium carbonate to free the phenylenediamine derivative from its salt. The phenylenediamine derivative separated out as an oil. The oil was separated from the aqueous liquors, and then subjected to distillation at a pressure of from 0.1 to 0.2 mm. of mercury, whereupon it was obtained as a nearly colorless viscid liquid.

In a manner similar to that illustrated in the foregoing example, phenylenediamine derivatives obtained from condensation products produced by condensing, with the elimination of water, hydroquinone with primary normal butyl primary amine, with secondary amyl-2 primary amine, or with secondary amyl-3 primary amine, can be purified.

What I claim as my invention and desire to be secured by Letters Patent of the United States is:

1. A process for removing colored impurities from a N,N'-dialkyl-p-phenylenediamine obtained from a condensation product produced by condensing, with the elimination of water, hydroquinone with a primary amine selected from the group consisting of primary alkyl primary amines and secondary alkyl primary amines containing at least four carbon atoms, comprising treating a salt of the phenylenediamine derivative with an alcohol selected from the group consisting of methyl, ethyl and isopropyl alcohols.

2. A process for removing colored impurities from a N,N'-dialkyl-p-phenylenediamine obtained from a condensation product produced by condensing, with the elimination of water, hydroquinone with a primary amine selected from the group consisting of primary alkyl amines and secondary alkyl amines containing at least four carbon atoms, comprising treating a hydrochloride of the phenylenediamine derivative with an alcohol selected from the group consisting of methyl, ethyl and isopropyl alcohols.

3. A process for removing colored impurities from a N,N'-di-(secondary alkyl)-p-phenylenediamine obtained from a condensation product produced by condensing, with the elimination of water, hydroquinone with a secondary alkyl primary amine containing at least four carbon atoms, comprising treating a salt of the phenylenediamine derivative with an alcohol selected from the group consisting of methyl, ethyl and isopropyl alcohols.

4. A process for removing colored impurities from a N,N'-di-(secondary alkyl)-p-phenylenediamine obtained from a condensation product produced by condensing, with the elimination of water, hydroquinone with a secondary alkyl primary amine containing at least four carbon atoms, comprising treating a hydrochloride of the phenylenediamine derivative with an alcohol selected from the group consisting of methyl, ethyl and isopropyl alcohols.

5. A process for removing colored impurities from a N,N'-di-(secondary butyl)-p-phenylenediamine obtained from a condensation product produced by condensing, with the elimination of water, hydroquinone with secondary butyl primary amine, comprising treating a salt of the phenylenediamine derivative with an alcohol selected from the group consisting of methyl, ethyl and isopropyl alcohols.

6. A process for removing colored impurities from a N,N'-di-(secondary butyl)-p-phenylenediamine obtained from a condensation product produced by condensing, with the elimination of water, hydroquinone with secondary butyl primary amine, comprising treating a hydrochloride of the phenylenediamine derivative with an alcohol selected from the group consisting of methyl, ethyl and isopropyl alcohols.

7. A process for removing colored impurities from a N,N'-di-(secondary butyl)-p-phenylenediamine obtained from a condensation product produced by condensing, with the elimination of water, hydroquinone with secondary butyl primary amine, comprising dissolving the phenylenediamine derivative in an alcohol selected from the group consisting of methyl, ethyl and isopropyl alcohols, and adding to the resulting solution an acid which forms a salt with the phenylenediamine derivative.

8. A process for removing colored impurities from a N,N'-di-(secondary butyl)-p-phenylenediamine obtained from a condensation product produced by condensing, with the elimination of water, hydroquinone with secondary butyl primary amine, comprising dissolving the phenylenediamine derivative in an alcohol selected from the group consisting of methyl, ethyl and isopropyl alcohols, and adding to the resulting solution hydrochloric acid.

MARSHALL R. BRIMER.